US008463946B2

(12) United States Patent
Ferguson et al.

(10) Patent No.: US 8,463,946 B2
(45) Date of Patent: Jun. 11, 2013

(54) METHOD FOR AUTOMATIC RADIO OPERATIONAL MODE SELECTION

(75) Inventors: Alan Lewis Ferguson, Peoria, IL (US); Brian Lane Jenkins, Washington, IL (US); Trent Ray Meiss, Eureka, IL (US); Steven Wayne O'Neal, Bartonville, IL (US); Daniel Craig Wood, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2034 days.

(21) Appl. No.: 10/942,921

(22) Filed: Sep. 17, 2004

(65) Prior Publication Data

US 2006/0079278 A1 Apr. 13, 2006

(51) Int. Cl.
*G06F 15/16* (2006.01)

(52) U.S. Cl.
USPC ......... 709/250; 709/209; 455/557; 455/552.1

(58) Field of Classification Search
USPC ............... 455/557, 552.1; 709/200, 201, 209, 709/238, 245, 250
See application file for complete search history.

(56) References Cited

U.S. PATENT DOCUMENTS

| | | | | |
|---|---|---|---|---|
| 3,672,725 | A * | 6/1972 | Johnson | 299/8 |
| 6,408,188 | B1 * | 6/2002 | Park | 455/466 |
| 6,600,430 | B2 | 7/2003 | Minagawa et al. | |
| 7,073,080 | B2 * | 7/2006 | Lou | 713/320 |
| 7,084,735 | B2 * | 8/2006 | Kapolka | 340/5.5 |
| 7,162,347 | B2 * | 1/2007 | Shibamori et al. | 701/50 |
| 7,631,056 | B2 * | 12/2009 | Kouda et al. | 709/220 |
| 2002/0038172 | A1 * | 3/2002 | Kinugawa | 701/50 |
| 2002/0140549 | A1 * | 10/2002 | Tseng | 340/426 |
| 2003/0023325 | A1 * | 1/2003 | Adachi et al. | 700/9 |
| 2003/0120395 | A1 | 6/2003 | Kacel | |
| 2003/0139179 | A1 * | 7/2003 | Fuchs et al. | 455/426 |
| 2003/0158635 | A1 | 8/2003 | Pillar et al. | |
| 2003/0211866 | A1 * | 11/2003 | Narazaki et al. | 455/561 |
| 2004/0030749 | A1 * | 2/2004 | Bowman-Amuah | 709/204 |
| 2004/0036583 | A1 * | 2/2004 | Kajita et al. | 340/426.1 |
| 2004/0203974 | A1 * | 10/2004 | Seibel | 455/517 |
| 2004/0204069 | A1 * | 10/2004 | Cui et al. | 455/557 |
| 2004/0236489 | A1 * | 11/2004 | Shibamori et al. | 701/50 |
| 2005/0055147 | A1 * | 3/2005 | Hrazdera et al. | 701/50 |
| 2005/0132104 | A1 * | 6/2005 | Brown | 710/36 |
| 2006/0031441 | A1 * | 2/2006 | Davis et al. | 709/223 |

FOREIGN PATENT DOCUMENTS

| | | |
|---|---|---|
| WO | WO 02/092372 | 11/2002 |
| WO | WO 2004/019209 | 3/2004 |

* cited by examiner

*Primary Examiner* — Dhairya A Patel
(74) *Attorney, Agent, or Firm* — Finnegan, Henderson, Farabow, Garrett & Dunner LLP

(57) ABSTRACT

A method is performed to collect information in a machine including an on-board data link connecting a wireless device and at least one on-board module. The process includes providing a first operational mode for the wireless device that allows the wireless device to perform a first set of operations on data associated with the at least one on-board module and providing a second operational mode for the wireless device that allows the wireless device to perform a second set of operations on the data associated with the at least one on-board module, wherein the second set of operations is a subset of the first set of operations. The process also determines an operational mode for the wireless device based on predetermined criteria and configures the wireless device based on the determined operational mode. Further, the process includes operating the wireless device in either the first or second operational mode based on the configuring.

21 Claims, 8 Drawing Sheets

METHOD FOR AUTOMATIC RADIO OPERATIONAL MODE SELECTION

TECHNICAL FIELD

This disclosure relates generally to work machine communications and data exchanges, and more particularly to systems and methods for operating communication devices within work machines.

BACKGROUND

An important feature in modern work machines (e.g., fixed and mobile commercial machines, such as construction machines, fixed engine systems, marine-based machines, etc.) is the on-board network and associated machine control modules. An on-board network includes many different modules connected to various types of communication links. These links may be proprietary and non-proprietary, such as manufacturer-based data links and communication paths based on known industry standards (e.g., J1939, RS232, RP 1210, RS-422, RS-485, MODBUS, CAN, etc.). The modules may monitor and/or control one or more components and/or operations of the work machine. The control modules may also receive data from and transmit data to external systems.

Wireless or radio communication links are frequently used for transmitting data from on-board control modules to external systems. Wireless devices or radio devices are generally incorporated into on-board computers, such as described in U.S. Pat. No. 6,600,430. However, as wireless or radio technology is still evolving, different standards may require updating or replacing the wireless or radio devices incorporated into the on-board computers. This maintenance may be time consuming and costly.

In order to reduce such costs, conventional systems may use less complex communication devices that are cheaper to replace. Such devices, however, may not have enough processing power to satisfy an ever-growing need for fast and comprehensive data communications.

Methods and systems consistent with certain features of the disclosed specification are directed to solving one or more of the problems set forth above.

SUMMARY OF THE INVENTION

In one embodiment, a method is performed to collect information in a work machine including an on-board data link connecting a wireless device and at least one on-board module. The process includes providing a first operational mode for the wireless device that allows the wireless device to perform a first set of operations on data associated with the at least one on-board module and providing a second operational mode for the wireless device that allows the wireless device to perform a second set of operations on the data associated with the at least one on-board module. The second set of operations may be a subset of the first set of operations. The process may also include determining an operational mode for the wireless device based on predetermined criteria and configuring the wireless device based on the determined operational mode. Based on the configuration, the wireless device may be operated in either the first or second operational mode.

In another embodiment, a communication system is provided for use in an on-board system of a work machine. The communication system may include one or more wireless devices capable of both collecting and communicating data when operating in a standalone mode and capable of only communicating when operating in a channel mode, and an interface control system capable of performing data collecting and processing operations in the work machine. The communication system may also include one or more data links for coupling the interface control system with the one or more wireless devices such that the interface control system uses the one or more wireless devices for communicating with an off-board system. The interface control system may selectively configure the one or more wireless device to operate in standalone mode or channel mode.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
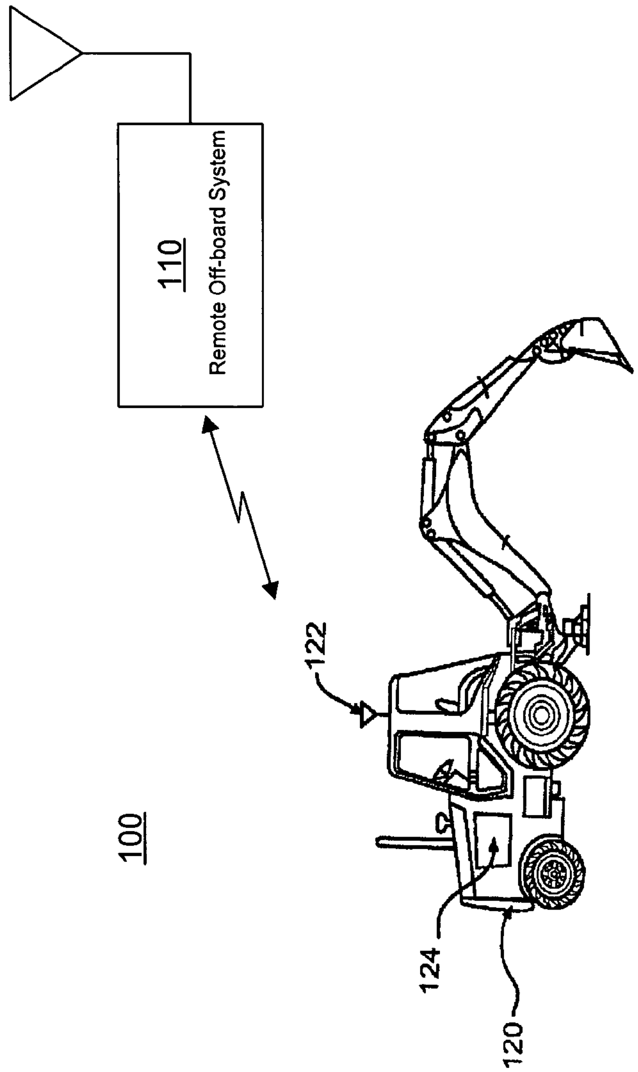
FIG. 1 is a pictorial illustration of an exemplary system that may be configured to perform certain functions consistent with certain disclosed embodiments.

FIG. 1 illustrates an exemplary work machine environment 100 in which features and principles consistent with certain disclosed embodiments may be implemented. As shown in FIG. 1, a work machine environment 100 may include a remote off-board system 110 and a work machine 120. Work machine 120 may use an on-board system 124 to communicate with off-board system 110. On-board system 124 may use a wireless communication device 122 to establish a communication channel between off-board system 110 and on-board system 124. Although only one work machine 120 and one off-board system 110 are shown, environment 100 may include any number and types of such machine and/or off-board systems.

Work machine 120 refers to a fixed or mobile machine that performs some type of operation associated with a particular industry, such as mining, construction, farming, etc. and operates between or within work environments (e.g., construction site, mine site, power plants, etc.). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, work machines 120 is a backhoe type work machine. The type of work machine illustrated in FIG. 1 is exemplary and not intended to be limiting. It is contemplated by the disclosed embodiments that environment 100 may implement any number of different types of work machines.

Off-board system 110 may represent a system that is located remotely from work machine 120. Off-board system 110 may be a system that connects to work machine 120 through wire or wireless data links. Further, off-board system 110 may be a computer system including known computing components, such as one or more processors, software, display, and interface devices that operate collectively to perform one or more processes. Alternatively, or additionally, off-board system 110 may include one or more communication devices that facilitate transmission of data to and from work machine 120. In certain embodiments, off-board system 110 may be another work machine remotely located from work machine 120.

Off-board system 110 may also represent one or more computing systems associated with entities that generates, maintains, sends, and/or receives information associated with work machine 120. Off-board system 110 may detect different types of on-board systems and use different methods to communicate with the on-board systems. Further, off-board system 110 may include Web browser software that requests and receives data from a server when executed by a processor and displays content to a user operating the system. A user may also control certain aspects of on-board systems using control commands sent from off-board system 110 to targeted on-board systems.

On-board system 124 may represent a system of one or more on-board modules, interface systems, data links, and other types of components that perform machine processes within work machine 120. On-board system 124 may also include communication devices for communicating with different types of off-board systems. As shown in FIG. 1, on-board system 124 includes a wireless communication device 122 to remotely communicate with off-board system 110.

Figure 2:
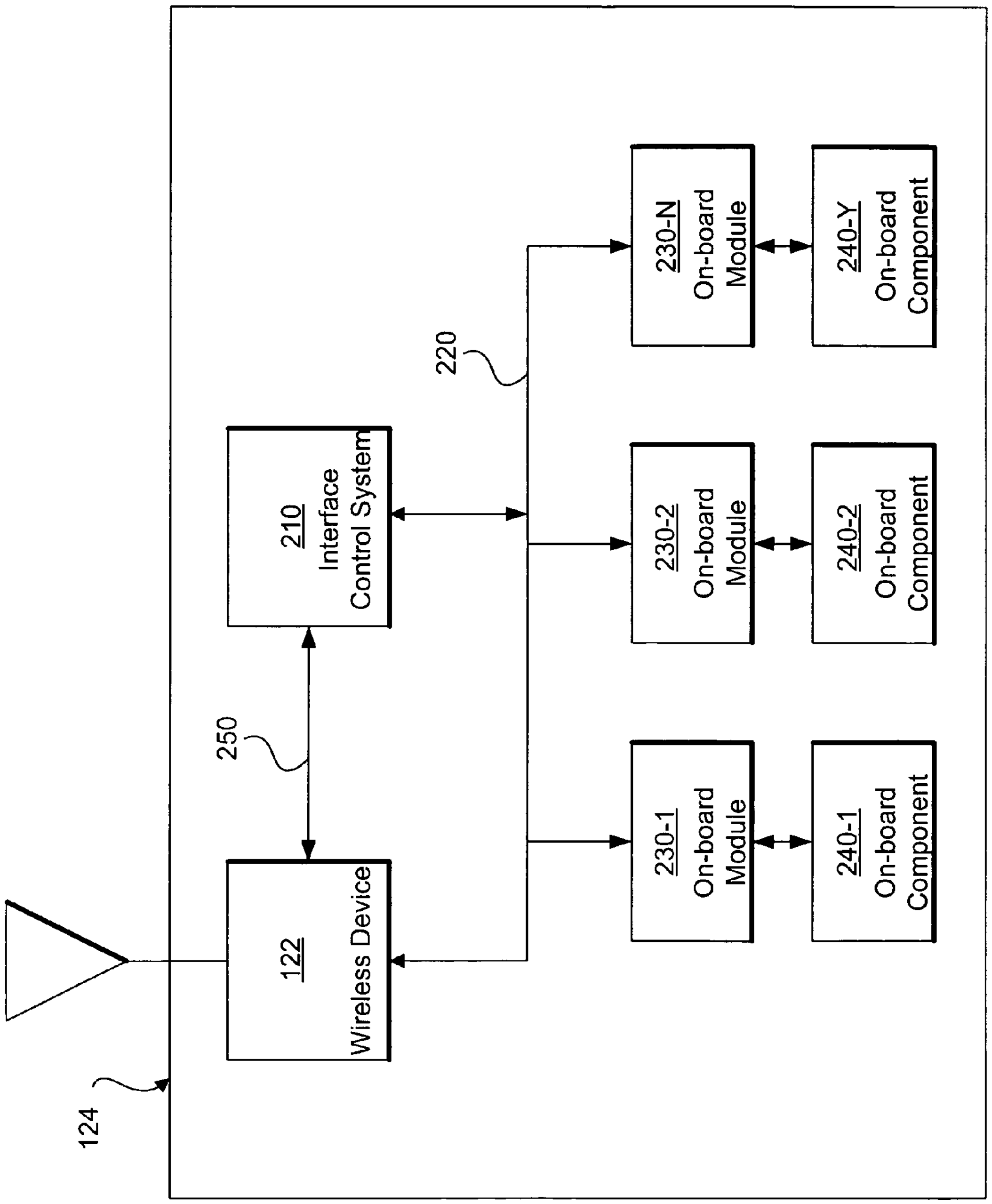
FIG. 2 illustrates a block diagram of an on-board system consistent with certain disclosed embodiments.

FIG. 2 illustrates a block diagram of on-board system 124 consistent with certain disclosed embodiments. As shown in FIG. 2, on-board system 124 may include a wireless device 122, an interface control system 210, on-board modules 230-1 to 230-N, on-board components 240-1 to 240-Y, a data link 220, and a link 250. On-board modules 230-1 to 230-N may include control modules or interface modules within work machine 120 that control on-board components 240-1 to 240-Y or other types of sub-components. For example, on-board modules 230-1 to 230-N may include an operator display device control module, an Engine Control Module (ECM), a power system control module, a Global Positioning System (GPS) interface device, an attachment interface that connects one or more sub-components, and any other type of device that work machine 120 may use to facilitate and/or monitor operations of the machine during run time or non-run time conditions (i.e., machine engine running or not running, respectively).

On-board components 240-1 to 240-Y may represent one or more components that receive data, control signals, commands, and/or information from on-board modules, 230-1 to 230-N, respectively. On board components 240-1 to 240-Y may also represent one or more components that transmit data, control signals, and/or other work data to on board modules 230-1 to 230-N. In certain embodiments, on-board components 240-1 to 240-Y may be controlled by respective on-board modules 230-1 to 230-N through the execution of software processes within these modules. On-board components 240-1 to 240-Y may represent different types of work machine components that perform various operations associated with the type of work machine 120. For example, on-board component 240-1 may be one or more engine components, while on-board component 240-Y may represent one or more transmission type components.

Interface control system 210 is an on-board computer system providing interface functions between work machine 120 and off-board system 110. Interface control system 210 may include known computer components such as one or more processors, memory modules, I/O devices, and display terminals, etc. Interface control system 210 may also include work machine specific components configured to support particular work machine functionalities. Interface control system 210 and on-board modules 230-1 to 230-N are interconnected by data link 220. Data link 220 may represent a proprietary or non-proprietary data link, such as a Society of Automotive Engineers (SAE) standard data link including Controller Area Network (CAN), J1939, etc. Data link 220 may be wired or wireless. Although FIG. 2 shows one data link 220, certain embodiments may include additional data links connected to one or more on-board modules 230-1 to 230-N that interconnect additional layers of on-board modules and/or interface control systems.

Through data link 220, interface control system 210 may control one or more on-board modules 230-1 to 230-N according to pre-programmed procedures. Additionally, off-board system 110 may control one or more on-board modules 230-1 to 230-N by sending control commands to interface control system 210. Further, interface control system 210 may also control on-board components 240-1 to 240-Y through on-board modules 230-1 to 230-N, respectively. Interface control system 210 may also perform various data processing functions and maintain data for use by one or more on-board modules 230-1 to 230-N or off-board system 110. For example, interface control system 210 may be configured to perform protocol conversions (e.g., tunneling and translations) and message routing services for on-board data links.

Interface control system 210 may also be configured to collect work data. For example, work data may include information associated with gas consumption, load weight, idle time, number of engine starts, load type, work machine type, terrain type, terrain grade, type of material manipulated by work machine 120, hours of operation, fluid levels, fluid consumptions, work site parameter data, and any other type of information related to work machine 120 and/or a work site. Interface control system 210 transmits work data to off-board system 110 for further processing via a wireless communication channel established between off-board system 110 and wireless device 122.

Wireless device 122 connects to interface control system 210 via link 250. In one embodiment, interface control system 210 uses wireless device 122 to establish a communication channel to exchange data with off-board system 110. Link 250 is configured such that both wireless device 122 and interface control system 210 may detect the presence of each other and may exchange commands and data with each other. Link 250 may be also configured to support plug-n-play type of operation, such that wireless device 122 may be plugged into link 250 while interface control system 210 is still in an operational state. Further, wireless device 122 may connect to interface control system 210 and on-board modules 230-1 to 230-N via data link 220. In one embodiment, wireless device 122 may also act as an interface between on-board modules 230-1 to 230-N and off-board system 110.

Figure 3:
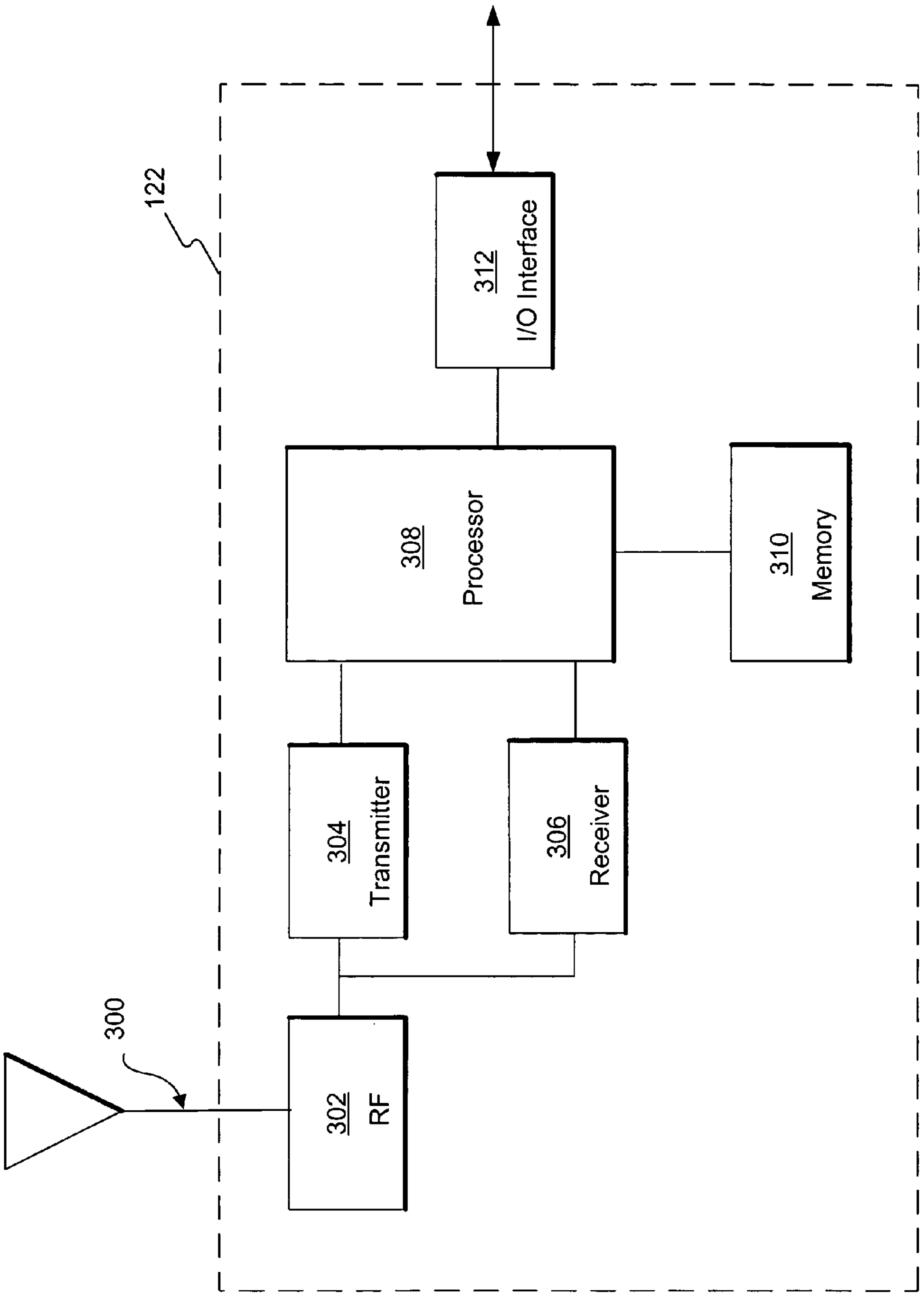
FIG. 3 illustrates a block diagram of an exemplary wireless device consistent with certain disclosed embodiments.

As shown in FIG. 3, wireless device 122 includes an antenna 300, a RF 302, a transmitter 304, a receiver 306, a processor 308, memory 310, and an I/O interface 312. The components listed are exemplary only and are not limiting. Other components and functionalities may be added consistent with the disclosed embodiments.

Antenna 300 serves to transmit and receive data over a wireless medium to and from off-board system 110. RF 302 controls antenna 300 for both transmitting and receiving. Transmitter 304 modulates transmission signals to antenna 300 and receiver 306 de-modulates received signals from antenna 300. Processor 308 may be a general purpose microprocessor or a microcontroller unit with internal memory and I/O units. Processor 308 may also perform wireless communication data processing. Processor 308 may also perform other management functionalities required to manage other components within wireless device 122. Further, processor 308 may perform various processes to determine an operational mode for wireless device 122 and to communicate with interface control system 210 via link 250.

Memory 310 may be one or more memory devices including, but not limited to, ROM, flash memory, dynamic RAM, and static RAM. Memory 310 may be configured to store information used by processor 308, such as program code and data required for performing startup and operations.

I/O interface 312 controls interfaces between processor 308 and interface control system 210 over link 250, interfaces between processor 308 and on-board modules 230-1 to 230-N over data link 220, and other interfaces between processor 308 and peripheral devices (not shown).

Figure 4:
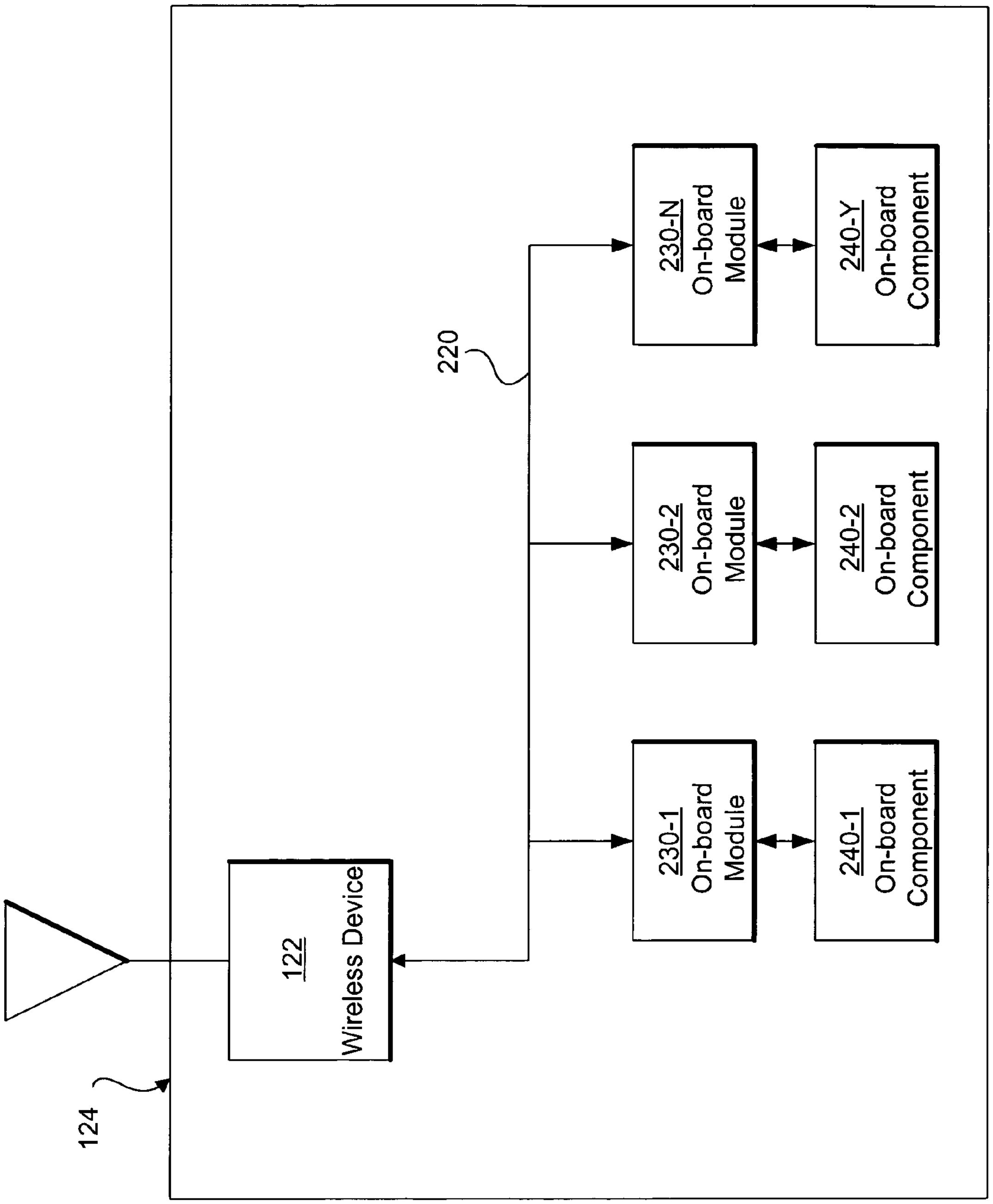
FIG. 4 illustrates a block diagram of another on-board system consistent with certain disclosed embodiments.

Wireless device 122 may operate in one of two modes, a standalone mode or a channel mode. When operating in the standalone mode, wireless device 122 serves as a main interface between on-board modules 230-1 to 230-N and off-board system 110 for collecting information and transmitting collected information to off-board system 110. In certain embodiments, wireless device 122 may perform limited data collection operations similar to those performed by interface control system 210. Wireless device 122, however, may be configured with reduced processing and memory capabilities as compared to interface control system 210. Accordingly, the information (e.g., work data) collected and/or stored by wireless device 122 may be a subset of the type or amount of information that interface control device 122 may collect and process. FIG. 4 illustrates an on-board system 124 with a wireless device 122 operating in a standalone mode.

As shown in FIG. 4, no interface control system is utilized within on-board system 124 when wireless device 122 operates in a standalone mode. During operations, wireless device 122 collects information from on-board modules 230-1 to 230-N and forwards the information to off-board system 110. Wireless device 122 may also, upon requests from on-board modules 230-1 to 230-N, relay information on behalf of on-board modules 230-1 to 230-N. Further, wireless device 122 may receive information from off-board system 110 and forward this information to on-board modules 230-1 to 230-N. In one embodiment, more complex features, such as exchanging control commands or protocol translations, however, may be not supported by wireless device 122.

In one embodiment, wireless device 122 may selectively collect certain work machine parameters in standalone mode. For example, work machine parameters may include engine RPM, temperature, fluid level (oil, etc), and fuel level. If operating in standalone mode, wireless device 122 may collect only the fluid level and the fuel level. On the other hand, with wireless device 122 operating in channel mode, interface control system may collect both the engine RPM and the temperature, in addition to the fluid level and fuel level.

As mentioned above, wireless device 122 may also operate in a channel mode. While operating in this channel mode, wireless device 122 disables functionalities related to interfacing with on-board modules 230-1 to 230-N and independent information exchange with off-board system 110. In channel mode, wireless device 122 acts as a conduit for conveying information from interface control system 210 to off-board system 110 or vice versa. That is, wireless device 122 may be used as a communication channel for interface control system 210 and perform no substantive data processing. Instead, interface control system 210 performs features of the data collection, storage, and processing associated with operations of work machine 120.

Although wireless device 122 is described as operating in standalone mode when interface control system 210 is not installed in on-board system 124, other embodiments enable wireless device 122 to operate in standalone mode when interface control system 210 is present in on-board system 124.

Also, switching between standalone and channel mode may be based on the presence (e.g., actual or virtual) of interface control system 210 in on-board system 124. For example, in one embodiment, wireless device 122 may monitor a signal from link 250 reflecting a physical presence of interface control system 210. If interface control system 210 is not present, wireless device 122 automatically operates in a standalone mode. If interface control system 210 is present, however, wireless device 122 may further determine whether interface control system 210 configures a specific mode for wireless device 122 to operate in. If wireless device 122 determines that it is configured by interface control system 210 to operate in a channel mode, wireless device 122 operates in the channel mode. In the event interface control system 210 fails or is in an off-line state, wireless device 122 may still operate in a standalone mode even if interface control system 210 is physically present (i.e., interface control system 210 is not logically connected or communicates with wireless device 122).

Wireless device 122 may also be a self-contained module such that it operates as a plug-in module. Updating or replacing wireless device 122 can be achieved by removing the existing device and plugging in a replacement device within on-board system 124. This enables work machine 120 to adapt to new radio technologies and standards without incurring unnecessary or extra maintenance or upgrade costs. Therefore, communications between work machine 120 and off-board system 110 can be upgraded by only upgrading wireless device 122 and without upgrading interface control system 210.

Figure 5:
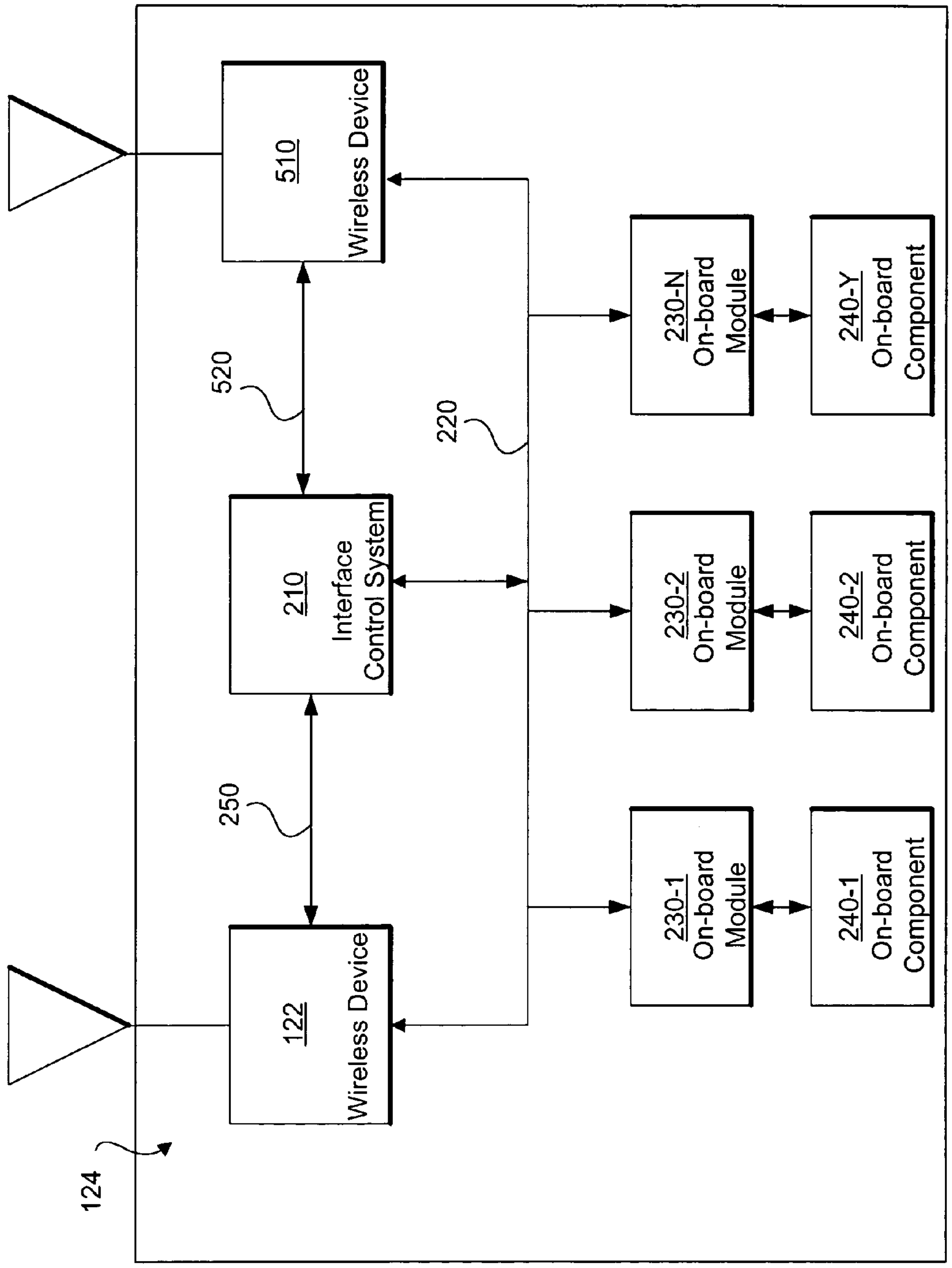
FIG. 5 illustrates a block diagram of another on-board system consistent with certain disclosed embodiments.

In another embodiment, on-board system 124 may include multiple wireless devices 122 and 510, each connected to interface control system 210. As shown in FIG. 5, two wireless devices 122 and 510 are interconnected to on-board modules 230-1 and 230-N via link 250 and 520, respectively. In such configuration, interface control system 210 may select either or both wireless devices 122 and 510 to communicate with off-board system 110. Wireless devices 122 and 510 may operate according to different or similar radio technologies or standards, or use different radio frequencies. Further, wireless devices 122 and 510 may act as backups for each other in case of hardware failures of the other device. That is, upon failure of one wireless device, the other may be used to exchange information with off-board system 110.

As explained, wireless device 122 (and/or 520) may operate in standalone or channel mode. On-board system 124 may allow selecting of these modes to take place through executing of software programs stored in wireless device 122 and/or interface control system 210. Additionally, or alternatively, the determined mode may also be controlled by off-board system 110 using control commands.

Figure 6:
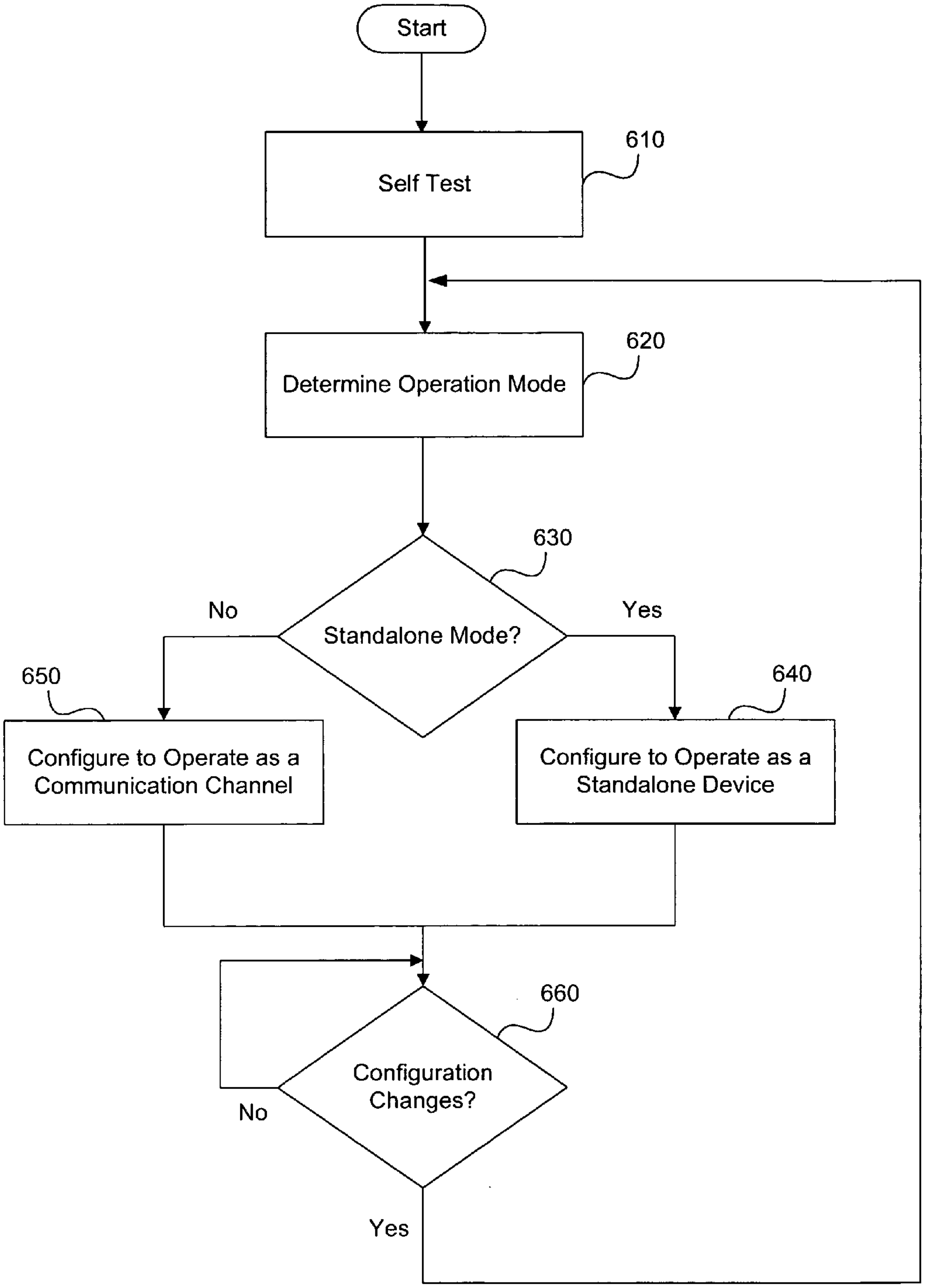
FIG. 6 illustrates a flowchart of a configuration process performed by a wireless device consistent with certain disclosed embodiments.

FIG. 6 illustrates a flowchart of an exemplary configuration process that may be performed by wireless device 122, more specifically, by processor 308 within wireless device 122. Initially, when wireless device 122 is powered on or initialized, processor 308 executes one or more software programs stored in memory 310 to perform a configuration process for configuring wireless device 122. For example, in step 610, processor 308 performs a self test to check every component within wireless device 122. After a successful self test, processor 308 determines the device's operational mode (step 620). In one embodiment, processor 308 may perform a mode detection process to determine the appropriate operational mode of wireless device 122. A further description of the mode detection process is provided below in connection with FIG. 7. Based on the results of the mode detection process, processor 308 then determines whether wireless device 122 is to operate in standalone mode (step 630).

If device 122 is to operate in standalone mode (step 630; yes), processor 308 configures wireless device 122 to operate as a standalone device (step 640). In one embodiment, processor 308 may configure wireless device 122 in standalone mode by enabling an interface with data link 220, enabling information collecting capabilities, and enabling information forwarding capabilities. These capabilities may be represented or implemented via software programs stored in memory 310. Once enabled, these program may be executed by processor 308 to collect, store, and process data to/from on-board modules 230-1 to 230-N and/or off-board system 110.

If wireless device 122 is to operate in another mode (i.e., channel mode) (step 630; no), processor 308 configures wireless device 122 to operate as a communication channel for interface control system 210 in step 650. In step 650, processor 308 disables interface communications with data link 220, disables information collecting capabilities, and disables information forwarding capabilities. Further, once configured, processor 308 prepares for command and data exchange with interface control system 210. In channel mode, wireless device 122 and interface control system 308 can exchange data with off-board system 110 using the full feature of interface control system 210.

During operation of wireless device 122, processor 308 monitors internal and external changes that could have impact on its operational mode. Some changes may require wireless device 122 to re-determine the operational mode. For example, if interface control system 210 is physically removed from or inactivated within on-board system 124, wireless device 122 may need to change to standalone mode. Accordingly, wireless device 122 determines in step 660 whether a mode configuration change is required. If so (step 660; yes), the configuration process continues to step 620. If, however, no configuration change is required (step 660; no), processor 308 continues monitoring for any internal and external configuration changes (step 660; no). As explained, wireless device 122 may perform a mode detection process when perform the configuration process described above.

Figure 7:
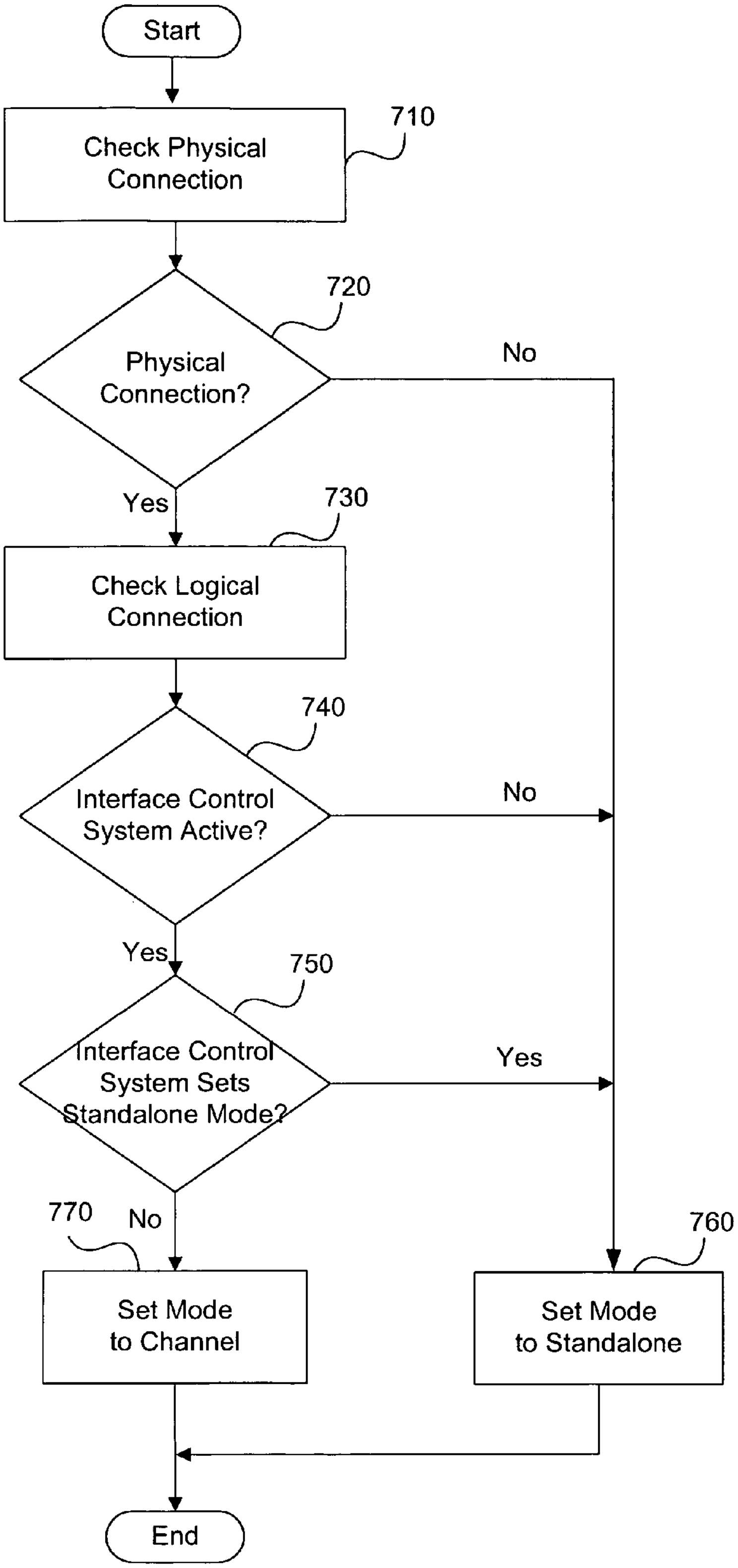
FIG. 7 illustrates a flowchart of a mode detection process performed by a wireless device consistent with certain disclosed embodiments.

FIG. 7 illustrates an exemplary mode detection process performed by processor 308 within wireless device 122 consistent with the disclosed embodiments. In step 710, processor 308 may check for a physical connection of interface control system 210 on link 250. If processor 308 does not detect a physical presence of interface control system 210 on link 250 (step 720; no), processor 308 sets the operational mode to a standalone mode in step 760 and exits the mode detection process.

If, however, processor 308 detects a physical presence of interface control system 210 on link 250 (step 720; yes), processor 308 determines whether there is a logical connection between wireless device 122 and interface control system 210. For example, interface control system 210 may be physically present in on-board system 124 but may be in an off-line state or may have previously experienced a failure. Thus, interface control system 210 may not be active (i.e., not logically present). In one embodiment, processor 308 may detect an inactive interface control system 210 through message exchange processes. For example, wireless device 122 may send one or more inquiry messages to interface control system 210 but receives no responding messages from interface control system 210. If processor 308 detects an inactive interface control system 210 (step 740; no), processor 308 sets the operational mode in standalone mode in step 760 and exits mode detection process.

On the other hand, if processor 308 detects an active interface control system 210 (i.e., logically and physically present) on link 250 (step 740; yes), processor 308 further checks if interface control system 210 has configured wireless device 122 to operate in standalone mode. This may be performed by checking hardware register settings set by interface control system 210 through link 250. Alternatively, processor 308 may check such configurations through message exchange processes. If processor 308 determines that interface control system 210 has configured wireless device 122 to operate in standalone mode (step 750; yes), processor 308 sets the operational mode as the standalone mode in step 760 and exits the mode detection process. If interface control system 210 does not configure wireless device 122 to operate in a standalone mode, or interface control system 210 configures wireless device 122 to operate in a channel mode (step 750; no), processor 308 sets the operational mode in channel mode in step 770 and exits the mode detection process. The operational mode set in the mode detection process is then used by the configuration process as explained above (e.g. steps 630-660).

Figure 8:
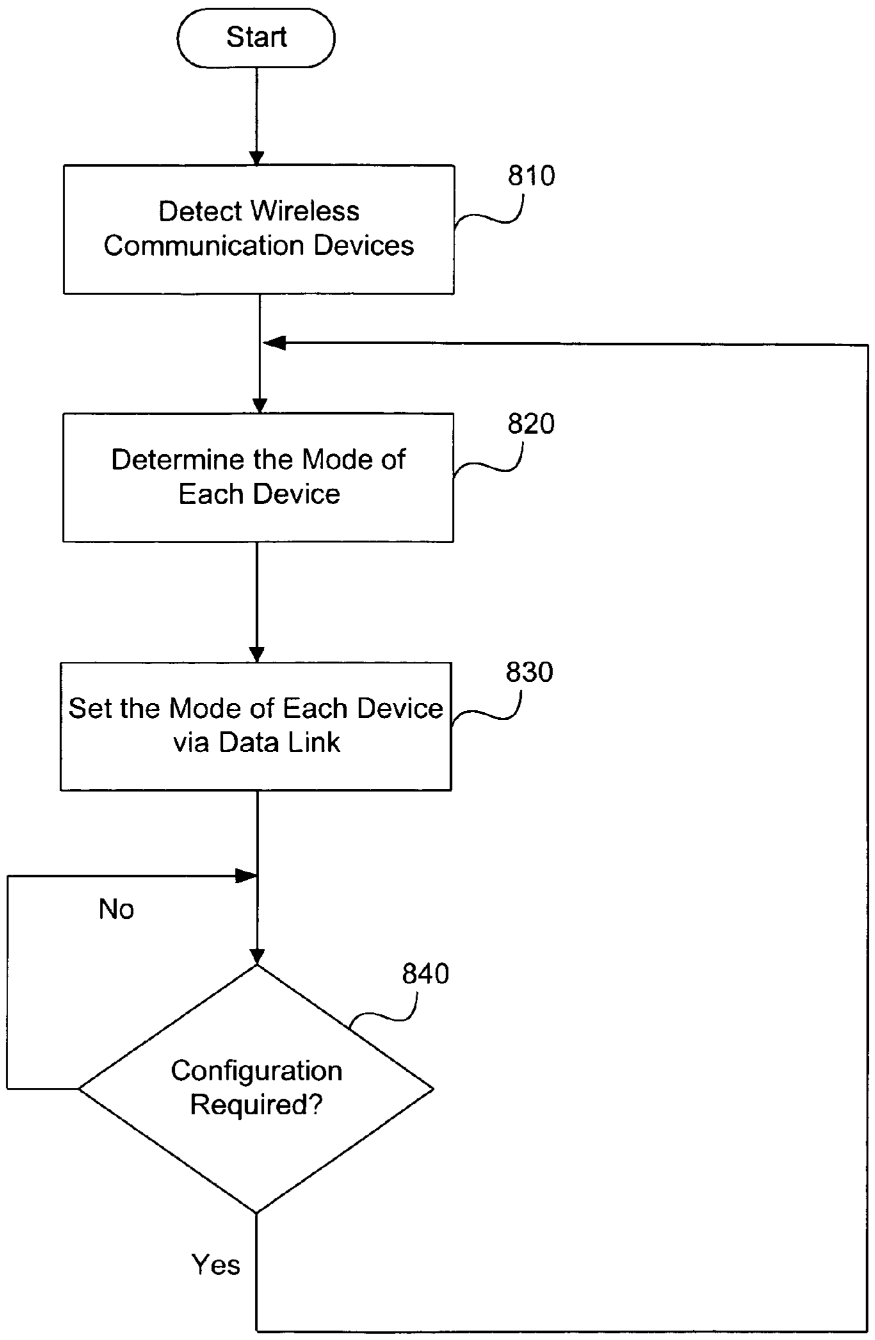
FIG. 8 illustrates a flowchart of a multi-wireless device configuration process performed by an on-board system consistent with certain disclosed embodiments.

FIG. 8 illustrates an exemplary multi-wireless device configuration process performed by interface control system 210 consistent with the disclosed embodiments. As explained in the descriptions corresponding to FIGS. 2 and 5, on-board system 124 may include one or more wireless devices. In operation, interface control system 210 may detect the presence of wireless device 122 or multiple wireless devices in step 810. For example, interface control system 210 may detect the physical presence of wireless device 122 on link 250 or logical presence of wireless device 122 through a message exchange processes. Similarly, interface control system 210 may detect the presence of wireless device 510 on link 520 and/or the logical presence of wireless device 510 through a message exchange processes. In step 820, interface control system 210 determines an operational mode of each wireless device detected in step 810.

In one embodiment, interface control system 210 may read status registers storing configuration information for each wireless communication device detected in step 810. Alternatively, each detected wireless device may send its operational mode status to interface control system 210. Other methods may be implemented by the disclosed embodiments to determine the appropriate mode of each detected wireless device. In another embodiment, interface control system 210 determines the operational mode of the detected wireless device in the same manner described above in connection with FIG. 7 and step 620 of FIG. 6. Once the operational mode is determined, interface control system 210 sets the appropriate operational mode for each wireless device 122 through link 250 and/or link 520 (step 830).

In step 840, interface control system 210 monitors internal and external changes to determine whether a new configuration is required. For example, in the event wireless device 122 fails, interface control system 210 may configure wireless device 510 to operate in a mode similar to failed wireless device 122. Further, interface control system 210 may also configure wireless device 122 to operate in a standalone mode before entering an off-line state for diagnostics. Alternatively, interface control system 210 may receive a configuration inquiry from wireless device 122 for mode configuration. Under such conditions, interface control system 210 may determine that a configuration mode change is required (step 840; yes). Therefore, interface control system 210 may execute the configuration process described above in connection with step from step 820 (step 840; yes). If no configuration is required (step 840; no), interface control system 210 continues monitoring for any changes within on-board system 124.

INDUSTRIAL APPLICABILITY

The disclosed systems and methods may provide a low cost wireless device solution that allows work machines to use multi-functional wireless devices based on the presence of additional complex interface systems. In one embodiment, the disclosed system provides a wireless device that performs a first feature set while operating in standalone mode, the first feature set including functionalities that are limited to simple data collecting tasks or devoted to specific parameters of the work machine. The same wireless device may also be configured to perform a second feature set that is limited in capabilities when an interface control system is operating in the work machine. In the second feature set, the wireless device may operate as a channel device that forwards information between the interface control device and an off-board system without processing and/or storing the information.

Further, methods and systems consistent with the disclosed embodiments may provide a solution that programs limited functionalities into wireless device so that the device may function as a low cost wireless solution and then to provide an upgrade path using a interface control system coupled with the device to provide more functionalities for an advanced wireless solution.

Other embodiments, features, aspects, and principles of the disclosed exemplary systems may be implemented in various environments and are not limited to work site environment. Embodiments other than those expressly described herein will be apparent to those skilled in the art from consideration of the specification and practice of the disclosed systems.

What is claimed is:

1. A method for collecting information in a machine including an on-board data link connecting a wireless device and at least one on-board module, the method comprising:

providing a first operational mode for the wireless device that allows the wireless device to perform a first set of operations on data associated with the at least one on-board module, wherein the first set of operations includes (i) collecting data for at least one of storing or processing by the wireless device (ii) communicating data; (iii) collecting data received from the at least one on-board module; (iv) forwarding data received from the at least one-board module to an off-board system remotely located from the machine; (v) collecting data received from the off-board system directed to the machine and (vi) forwarding data received from the off-board system to the at least one on-board module;

determining whether to provide the first operational mode for the wireless device based on absence of an interface control system in the machine, the interface control system being removable from the machine;

providing a second operational mode for the wireless device that allows the wireless device to perform at least a second set of operations on the data associated with the at least one on-board module, wherein the second set of operations includes forwarding data received from at least one on-board module to the off-board system and forwarding data received from the off-board system to the at least one one-board module; and wherein the second set of operations is a subset of the first set of operations such that at least one operation of the first set is disabled on the wireless device when the second operational mode is provided;

determining whether to provide the second operational mode for the wireless device based on presence of the interface control system in the machine;

operating the interface control system to perform the at least one operation of the first set that is disabled on the wireless device when the wireless device operates in the second operational mode;

configuring the wireless device based on the determined operational mode, wherein configuring includes enabling functionalities of the wireless device related to the determined operational mode; and disabling functionalities of the wireless device unrelated to the determined operational mode; and operating the wireless device in either the first or second operational mode based on the configuring.

2. The method of claim 1, wherein at least one of determining whether to provide the first operational mode and determining whether to provide the second operational mode includes:

determining whether to provide the first operational mode or the second operational mode based on an operational status of the interface control system.

3. The method of claim 2, wherein the operational status is determined based on configuration information provided by the interface control system.

4. The method of claim 2, wherein the at least one of determining whether to provide the first operational mode and determining whether to provide the second operational mode further includes:

determining whether the interface control system is logically connected to the wireless device.

5. The method of claim 4, wherein determining whether the interface control system is logically connected to the wireless device includes:

performing a message exchange process to determine whether the interface control system is logically connected to the wireless device.

6. The method of claim 1, wherein the first set of operations further includes at least one of:

processing data received from the at least one on-board module; and processing data received from the off-board system.

7. The method of claim 6, wherein the at least one on-board module collects machine parameters during operations of the machine and collecting a subset of the machine parameters from the at least one on-board module.

8. The method of claim 1, wherein the interface control system performs at least the first set of operations when the wireless device operates in the second operational mode.

9. The method of claim 1, wherein, when the second operational mode is provided, the at least one operation of the first set is disabled and the remaining operations of the first set are enabled and included in the second set of operations.

10. A method for operating a wireless device in a machine capable of receiving an interface control system that performs interface functions between an on-board data link and an off-board system through the wireless device, the method comprising:

providing at least a standalone operational mode and a channel operational mode for the wireless device, the standalone operational mode providing a number of wireless device functionalities that is greater than a number of functionalities provided in the channel operational mode such that the standalone operational mode allows the wireless device to perform more operations than the channel operational mode, wherein the standalone operational mode allows the wireless device to perform a first set of operations including (i) collecting data for at least one of storing or processing by the wireless device (ii) communicating data; (iii) collecting data received from the at least one on-board module; (iv) forwarding data received from the at least one-board module to an off-board system remotely located from the machine; (v) collecting data received from the off-board system directed to the machine and (vi) forwarding data received from the off-board system to the at least one on-board module;

providing the standalone operational mode for the wireless device based on absence of the interface control system in the machine, the interface control system being removable from the machine;

configuring the wireless device based on the determined standalone operational mode;

operating the wireless device in the determined standalone operational mode; and enabling the communicating operation and disabling the collecting operation when the wireless device operates in the channel operational mode.

11. The method of claim 10, further including: selecting the channel operational mode based on the presence of the interface control system and information provided by the interface control system.

12. The method of claim 10, including:

monitoring an operational status of at least one of the wireless device and the interface control system; and re-configuring the wireless device based on a changed operational status of the at least one wireless device and interface control system.

13. A method for providing a communication system in a machine including an interface control system, a first and second wireless device, and an on-board module, the method comprising:

configuring the first wireless device to operate in a channel mode or standalone mode based on an operational status of the interface control system, wherein the standalone mode includes operations for collecting data from the on-board module for at least one of storing or processing by the first wireless device and for communicating with an off-board system and the on-board module without communicating the data from the on-board module to the interface control system, and wherein the channel mode includes operations for communicating data with the off-board system and the interface control module without collecting data from the on-board module for at least one of storing or processing by the first wireless device;

configuring the second wireless device to operate in either the channel mode or standalone mode based on the operational status of the interface control system and the operational mode of the first wireless device; and exchanging data between the on-board module and the off-board system using at least one of the first wireless device, the second wireless device and the interface control system, wherein exchanging data between the on-board module and the off-board system includes based on absence of interface control system, establishing communication between the off-board system and at least one of the first and second wireless device configured to operate in the standalone mode for information collecting.

14. The method of claim 13, wherein exchanging data between the on-board module and the off-board module system includes:

establishing communications between the off-board system and the interface control system for information collecting and information processing using the wireless devices configured to operate in the channel mode.

15. The method of claim 14, further including:

upgrading at least one of the first and second wireless devices to improve communications between the off-board system and the interface control system without upgrading the interface control system.

16. The method of claim 13, further including communicating data from the on-board module to the interface control system when at least one of the first wireless device or the second wireless device is in the channel mode.

17. A wireless communication device capable of coupling with an interface control system in a machine, the wireless communication device comprising:

a memory including program code that performs a process when executed, the process including:

providing at least a standalone operational mode and a channel operational mode for the wireless communication device, the standalone operational mode providing a number of wireless device functionalities that is greater than a number of functionalities provided in the channel operational mode such that the standalone operational mode allows the wireless communication device to perform more operations than the channel operational mode, wherein the standalone operational mode allows the wireless communication device to perform a first set of operations including (i) collecting data for at least one of storing or processing by the wireless communication device (ii) communicating data; (iii) collecting data received from the at least one on-board module; (iv) forwarding data received from the at least one-board module to an off-board system remotely located from the machine; (iv) collecting data received from the off-board system directed to the machine and (v) forwarding data received from the off-board system to the at least one on-board module;

providing the standalone operational mode for the wireless communication device based on an absence of the interface control system in the machine, the interface control system being removable from the machine;

configuring the wireless communication device based on the determined standalone operational mode;

performing communication functions based on the determined standalone operational mode;

enabling the communicating operation and disabling the collecting operation when the wireless communication device operates in the channel operational mode; and a processor executing the program code to perform data communications between an off-board system and the machine.

18. A communication system for use in an on-board system of a machine, the communication system comprising:

a processor;

an interface control system capable of performing data collecting and processing operations in the machine;

one or more wireless devices configured to:

collect data from an on-board device for at least one of storing or processing by the one or more wireless devices and communicate data between an off-board system and the on-board device when operating in a standalone mode while the interface control system is unable to collect data from the on-board device, and communicate data between the off-board system and the interface control system while being unable to collect data from the on-board device for at least one of storing or processing when operating in a channel mode; and one or more data links for coupling the interface control system with the one or more wireless devices such that the interface control system uses the one or more wireless devices for communicating with the off-board system, wherein the interface control system selectively configures the one or more wireless devices to operate in standalone mode or channel mode, wherein the interface control system is configured to receive data from the on-board device when the one or more wireless device is operating in the channel mode, wherein the one or more wireless devices are replaceable to improve communications between the off-board system and the interface control system without upgrading the interface control system.

19. A wireless communication system for collecting information in a machine including an on-board data link connecting a wireless device and at least one on-board module, the system comprising:

a processor;

an on-board computer system, disposed on the machine, the on-board computer system being configured to:

provide a first operational mode for the wireless device that allows the wireless device to perform a first set of operations on data associated with the at least one on-board module, wherein the first set of operations includes (i) collecting data for at least one of storing or processing by the wireless device (ii) communicating data; (iii) collecting data received from the at least one on-board module; (iv) forwarding data received from the at least one-board module to an off-board system remotely located from the machine; (v) collecting data received from the off-board system directed to the machine and (vi) forwarding data received from the off-board system to the at least one on-board module;

determine whether to provide the first operational mode for the wireless device based on absence of an interface control system in the machine, the interface control system being removable from the machine;

provide a second operational mode for the wireless device that allows the wireless device to perform at least a second set of operations on the data associated with the at least one on-board module, wherein the second set of operations includes forwarding data received from at least one of on-board module to the off-board system and forwarding data received from the off-board system to the at least one one-board module; and wherein the second set of operations is a subset of the first set of operations such that at least one operation of the first set is disabled on the wireless device when the second operational mode is provided;

determine whether to provide the second operational mode for the wireless device based on presence of the interface control system in the machine;

operate the interface control system to perform the at least one operation of the first set that is disabled on the wireless device when the wireless device operates in the second operational mode;

configure the wireless device based on the determined operational mode, wherein the on-board computer system if further configured to:

enable functionalities of the wireless device related to the determined operational mode; and disable functionalities of the wireless device unrelated to the determined operational mode; and operate the wireless device in either the first or second operational mode based on the configuring.

20. The system of claim 19, wherein the on-board computer system is further configured to:

determine whether to provide the first operational mode or the second operational mode based on an operational status of the interface control system.

21. The system of claim 19, wherein the on-board computer system is further configured to determine the operational status based on configuration information provided by the interface control system.

* * * * *